(12) United States Patent
Wanat et al.

(10) Patent No.: US 12,632,944 B2
(45) Date of Patent: May 19, 2026

(54) NEURAL NETWORKS FOR DYNAMIC RANGE CONVERSION AND DISPLAY MANAGEMENT OF IMAGES

(71) Applicant: DOLBY LABORATORIES LICENSING CORPORATION, San Francisco, CA (US)

(72) Inventors: Robert Wanat, San Jose, CA (US); Anustup Kumar Atanu Choudhury, Campbell, CA (US); Robin Atkins, Vancouver (CA)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 299 days.

(21) Appl. No.: 18/291,578

(22) PCT Filed: Jul. 22, 2022

(86) PCT No.: PCT/US2022/037991
§ 371 (c)(1),
(2) Date: Jan. 24, 2024

(87) PCT Pub. No.: WO2023/009392
PCT Pub. Date: Feb. 2, 2023

(65) Prior Publication Data
US 2025/0095125 A1     Mar. 20, 2025

Related U.S. Application Data

(60) Provisional application No. 63/226,847, filed on Jul. 29, 2021.

(30) Foreign Application Priority Data

Jul. 29, 2021     (EP) ..................................... 21188516

(51) Int. Cl.
| | |
|---|---|
| *G06T 5/92* | (2024.01) |
| *G06V 10/60* | (2022.01) |
| *G06V 10/75* | (2022.01) |

(52) U.S. Cl.
CPC ................ *G06T 5/92* (2024.01); *G06V 10/60* (2022.01); *G06V 10/758* (2022.01); *G06T 2207/20084* (2013.01)

(58) Field of Classification Search
USPC ....................................................... 382/274
See application file for complete search history.

(56) References Cited

U.S. PATENT DOCUMENTS

| | | | | |
|---|---|---|---|---|
| 5,644,647 A | * | 7/1997 | Cosgrove | ............. H04N 1/6011 |
| | | | | 382/162 |
| 8,593,480 B1 | | 11/2013 | Ballestad | |

(Continued)

FOREIGN PATENT DOCUMENTS

| | | |
|---|---|---|
| CN | 105894456 A | 8/2016 |
| CN | 107451974 A | 12/2017 |

(Continued)

OTHER PUBLICATIONS

Bist Cambodge et al: "Tone expansion using lighting style aesthetics", Computers and Graphics, Elsevier, GB, vol. 62, Dec. 15, 2016 (Dec. 15, 2016), pp. 77-86, XP029900476, 10 pages.

(Continued)

*Primary Examiner* — Jacky X Zheng

(57) ABSTRACT

Methods and systems for dynamic range conversion and display mapping of standard dynamic range (SDR) images onto high dynamic range (HDR) displays are described. Given an SDR input image, a processor generates an intensity (luminance) image and optionally a base layer image and a detail layer image. A first neural network uses the intensity image to predict statistics of the SDR image in a higher dynamic range. These predicted statistics together (Continued)

with the original image statistics of the input image are used to derive an optimal tone-mapping curve to map the input SDR image onto an HDR display. Optionally, a second neural network, using the intensity image and the detail layer image, can generate a residual detail layer image in a higher dynamic range to enhance the tone-mapping of the base layer image into the higher dynamic range.

16 Claims, 4 Drawing Sheets

(56) References Cited

U.S. PATENT DOCUMENTS

| | | | |
|---|---|---|---|
| 9,961,237 B2 | 5/2018 | Atkins | |
| 10,600,166 B2 | 3/2020 | Pytlarz | |
| 11,310,537 B2 | 4/2022 | Gadgil | |
| 11,803,948 B2 | 10/2023 | Atkins | |
| 12,086,969 B2 * | 9/2024 | Kadu | H04N 19/196 |
| 2019/0108621 A1 | 4/2019 | Condorovici | |

| | | | | |
|---|---|---|---|---|
| 2020/0013375 A1 * | 1/2020 | Nishida | | G06T 5/70 |
| 2020/0320672 A1 | 10/2020 | Guermoud | | |
| 2021/0092461 A1 | 3/2021 | Gadgil | | |
| 2022/0044615 A1 * | 2/2022 | Pytlarz | | G09G 5/10 |
| 2022/0067890 A1 * | 3/2022 | Zhang | | G06T 9/002 |

FOREIGN PATENT DOCUMENTS

| | | |
|---|---|---|
| CN | 108702496 A | 10/2018 |
| CN | 110223256 A | 9/2019 |
| CN | 112614471 A | 4/2021 |
| EP | 3503019 A1 | 6/2019 |
| JP | 2021510885 A | 4/2021 |
| WO | 2019199701 A1 | 10/2019 |
| WO | 2020131731 A1 | 6/2020 |

OTHER PUBLICATIONS

Wang Chao et al: "Deep Inverse Tone Mapping for Compressed Images", IEEE Access, vol. 7, Jun. 20, 2019 (Jun. 20, 2019), pp. 74558-74569, XP011731162, 12 pages.

* cited by examiner

207

305

Input: 960x540x1
Filter Bank: 3x3x1x4
Output Size: 480x270x4
Bias:4
Stride:2

ReLU

310

Filter Bank: 3x3x1x8
Output Size: 240x135x8
Bias:8
Stride:2

ReLU

315

Filter Bank: 7x7x2x16
Output Size: 48x27x16
Bias:16
Stride:5

ReLU

320

Filter Bank: 48x27x16x3
Output Size: 1x1x3
Bias:3
Stride:1

210

212

NEURAL NETWORKS FOR DYNAMIC RANGE CONVERSION AND DISPLAY MANAGEMENT OF IMAGES

CROSS-REFERENCE TO RELATED APPLICATIONS

This application is the U.S. national stage entry of International Patent Application No. PCT/US2022/037991, filed Jul. 22, 2022, which claims the benefit of priority from U.S. Provisional Patent Application Ser. No. 63/226,847, filed on Jul. 29, 2021 and European Patent Application Ser. No. 21188516.5, filed on Jul. 29, 2021, each of which is hereby incorporated by reference in its entirety.

TECHNOLOGY

The present invention relates generally to images. More particularly, an embodiment of the present invention relates to the dynamic range conversion and display management of standard-dynamic range (SDR) images into high-dynamic range (HDR) displays.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where $n \leq 8$ (e.g., color 24-bit JPEG images) are considered images of standard dynamic range, while images where $n \geq 10$ may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, minimum, average, and maximum luminance values in an image, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

The creation and playback of high dynamic range (HDR) content is now becoming widespread as HDR technology offers more realistic and lifelike images than earlier formats. However, legacy content may be available only in standard dynamic range (SDR) and the broadcast infrastructure may not allow transmitting metadata to convert such content to a format suitable to take full advantage of the capabilities of an HDR display. To improve existing display schemes, as appreciated by the inventors here, improved techniques for the up-conversion and display management of SDR images to HDR displays are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
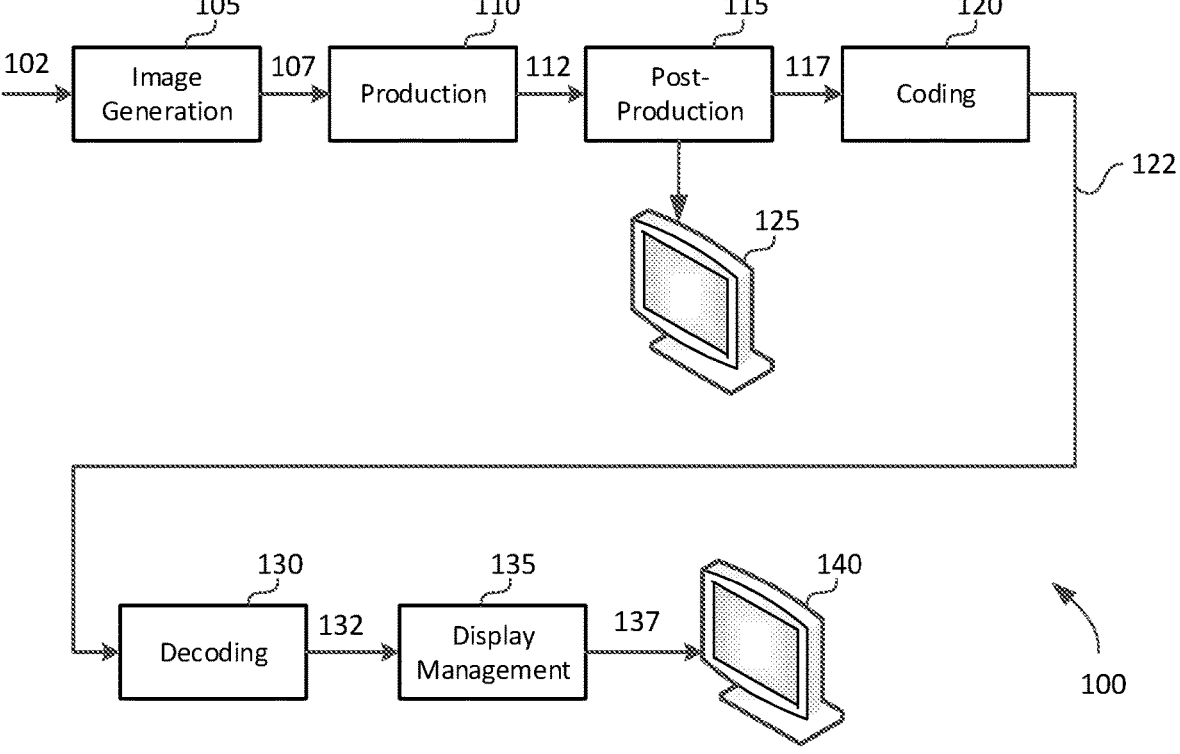
FIG. 1 depicts an example process for a video delivery pipeline.

Methods for the dynamic range conversion and display management of SDR images to HDR displays are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to methods for the dynamic range conversion and display management of SDR images onto HDR displays. In an embodiment, a processor receives an input image (202) in a first dynamic range and a first spatial resolution. It generates an intensity image (207) based on the input image, it applies the intensity image to a first neural network (210) to generate predicted statistics of the intensity image when mapped in a second dynamic range higher than the first dynamic range, it generates (215) a tone-mapping curve based on statistics of the intensity image and the predicted statistics, and applies the tone-mapping curve to display the input image to a display with a target dynamic range different than the second dynamic range. In an embodiment, a method for dynamic range conversion and display mapping comprises: accessing an input image in a first dynamic range and a first spatial resolution; generating an intensity image based on the input image; applying the intensity image to a first neural network to generate predicted statistics of the intensity image when mapped in a second dynamic range higher than the first dynamic range; and generating a tone-mapping curve based on statistics of the intensity image and the predicted statistics. The method may in an embodiment comprise generating, based on the input image and the tone-mapping curve, a mapped output image for display on a display with a target dynamic range. The target dynamic range may be different than the second dynamic range. In an embodiment the statistics of the intensity image comprise intensity values of the intensity image in the first dynamic range, and the predicted statistics comprise predicted intensity values in the second dynamic range (e.g. corresponding predicted intensity values in the second dynamic range).

In one embodiment, the first neural network may be trained on pairs of reference images in the second dynamic range (e.g. HDR) and reference images in the first dynamic range (e.g. SDR). The reference images in the first dynamic range may be generated by mapping each reference image in the second dynamic range to the first dynamic range using a tone mapping operation. The first neural network may be trained on the pairs of reference images in the second and first dynamic range to learn a relationship (e.g. minimize an error) between predicted statistics for the reference images in the first dynamic range (e.g. predicted statistics of the respective intensity images generated based on the reference images in the first dynamic range) and statistics of the reference images in the second dynamic range. In one embodiment, this may be done by iteratively calculating, for pairs of reference images in the first and second dynamic range, predicted statistics for the reference image in the first dynamic range using the first neural network and back-propagating the error between the predicted statistics and the statistics of the corresponding reference image in the second dynamic range into the first neural network. The training may be terminated when the error between reference and predicted statistics is within a small threshold or reaches a non-decreasing plateau. Alternatively, in another embodiment, after the generation of predicted statistics for a reference image in the first dynamic range using the first neural network, the predicted statistics may be applied to up-convert the reference image in the first dynamic range into its corresponding predicted image in the second dynamic range. The corresponding reference image in the second dynamic range and the predicted image in the second dynamic range may be compared, and errors between the predicted image and the reference image in the second dynamic range may be back-propagated into the first neural network.

In one embodiment, the method may further comprise: generating a base layer image and a detail layer image based on the intensity image; and applying the tone-mapping curve to the base layer image to generate a tone-mapped base layer image in the second dynamic range. In one embodiment, the method may further comprise: applying the intensity image and the detail layer image into a second neural network to generate a residual layer image in the second dynamic range; adding the residual layer image to the detail layer image to generate a second detail layer image; and adding the second detail layer image to the tone-mapped base layer image to generate an output image in the second dynamic range. In one embodiment the second neural network may be trained on pairs of reference images in the second dynamic range (e.g. HDR) and reference images in the first dynamic range (e.g. SDR). The reference images in the first dynamic range may be generated by mapping each reference image in the second dynamic range to the first dynamic range using a tone mapping operation. The second neural network may be trained on the pairs of reference images in the second and first dynamic range to learn a relationship (e.g. minimize an error) between a predicted image in the second dynamic range and a corresponding reference image in the second dynamic range. Each pair of reference images in the second and first dynamic range may be processed by the second neural network, wherein the errors between the reference image in the second dynamic range and the corresponding predicted image in the second dynamic range is back-propagated into the second neural network. The predicted image of each pair may be generated by: applying the intensity image generated based on the reference image in the first dynamic range, and the corresponding detail layer image into the second neural network to generate a residual layer image in the second dynamic range; adding the residual layer image to the detail layer image to generate a second detail layer image; and adding the second detail layer image to a tone-mapped base layer image generated by applying the tone-mapping curve to the intensity image, to generate the predicted output image in the second dynamic range.

SDR to HDR Image Mapping and Display Management

Video Coding Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Without limitations, examples of display management processes are described in Refs. [1] and [2].

SDR to HDR Dynamic Range-Conversion Pipeline

In traditional display mapping, the mapping algorithm applies a sigmoid like function (for examples, see Refs [3] and [4]) to map the input dynamic range to the dynamic range of the target display. Such mapping functions may be represented as piece-wise linear or non-linear polynomials characterized by anchor points, pivots, and other polynomial parameters generated using characteristics of the input source and the target display. For example, in Refs. [3-4] the mapping functions use anchor points based on luminance characteristics (e.g., the minimum, medium (average), and maximum luminance) of the input images and the display. However, other mapping functions may use different statistical data, such as luminance-variance or luminance-standard deviation values at a block level or for the whole image. For SDR images, the process may also be assisted by additional metadata which are either transmitted as part of the transmitted video or they are computed by the decoder or the display. For example, when the content provider has both SDR and HDR versions of the source content, a source may use both versions to generate metadata (such as piece-wise linear approximations of forward or backward reshaping functions) to assist the decoder in converting incoming SDR images to HDR images. However, in many broadcast scenarios, limitations in the HDR content availability, the transmitter, the communication media, and/or the receiver, may prohibit generating or transmitting such metadata, thus impeding the most efficient use of HDR displays.

Figure 2A:
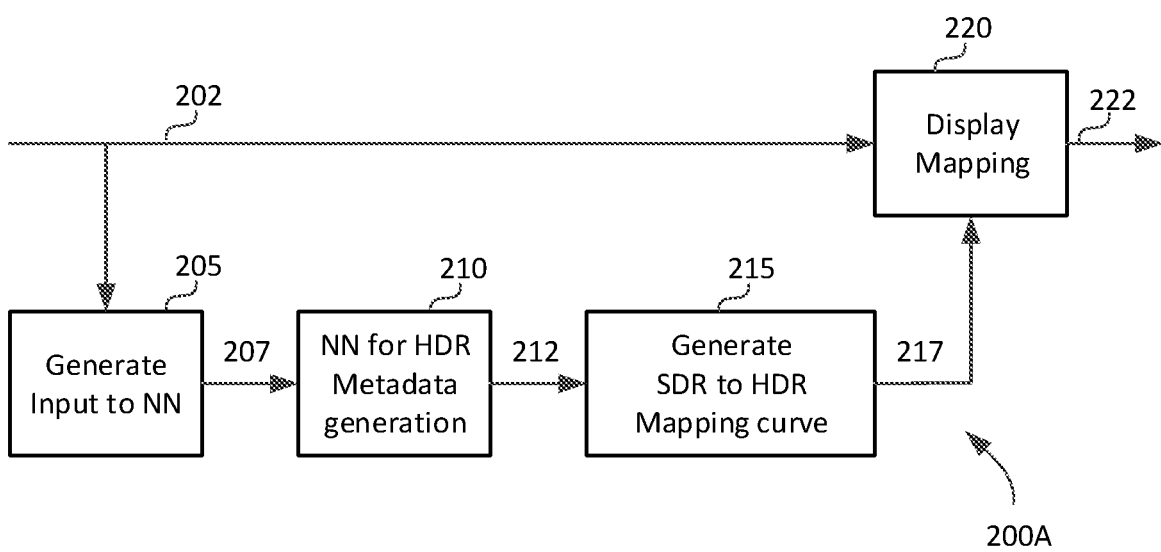
FIG. 2A depicts a dynamic range up-conversion and display management pipeline according to a first example embodiment of the present invention with a single neural-network processing unit.

FIG. 2A depicts a dynamic-range up-conversion and display management pipeline (200A) according to an example embodiment. As depicted in FIG. 2A, input video (202) may include video received from a video decoder and/or video received from a graphical processing unit (say, from a set-top box), and/or other video inputs (say, from a camera, an HDMI port in the TV or the set-top box, a graphical processing unit (GPU), and the like). Without limitation, input video 202 may be characterized as "SDR" video to be upconverted to "HDR" video to be displayed on a HDR display.

In an embodiment, process 200A includes a neural network (NN) (210) to generate a set of predicted HDR statistics (or metadata) to facilitate the generation of an optimized SDR-to-HDR mapping. Because of computational limitations, in an embodiment, the NN unit (210) may be preceded by a preprocessing unit (205) to translate the input image 202 to a suitable image in terms of color format and resolution. The output of NN unit 210 is used by mapping unit (215) to generate an optimized mapping curve, which, together with the original input (202), is fed to the display mapping unit (220), to generate the mapped output 222. Details of each component are described next.

Neural Network Input Generation

In block 205, the input image is converted to a format suitable for processing by the NN unit 210. In an embodiment, this process comprises two steps: a) extracting the intensity or luminance of the input signal, and b) adjusting its resolution. For example, to extract the intensity, input RGB images may be converted to a luma-chroma color format, such as YCbCr, ICtCp, and the like, using known in the art color-transformation techniques, such as ITU-R Rec. BT 2100 and the like. In an alternative embodiment, intensity may be characterized as the per-pixel maximum value of its R, G, and B components. The intensity extraction step may be bypassed if the source image is already represented as a single-channel intensity image. In some embodiment, pixel values may also be normalized to [0, 1] according to a predefined standard dynamic range, e.g., between 0.005 and 100 nits, to facilitate the computation of the image statistics.

The global metadata generation neural network (210) typically operates on fixed image dimensions, but the input dimensions of the image may vary based on the source content (e.g., 480p, 720p, 1080i, and the like). In an embodiment, unit 205 may resample the image size to dimensions used to train and operate the NN metadata generator (e.g., 960×540). For example, the 960×540 resolution has been found to provide a good trade-off between complexity and resolution with state of the art neural networks.

In an embodiment, if the input image is larger than the supported resolution of the NN, then it is down-sampled repeatedly by a factor of two until both the width and height are less than or equal to the desired resolution. As an example, and without limitation, the down-sampling operation may be performed by 4-tap separable horizontal and vertical low pass filters (e.g., [1 3 3 1]/8), followed by discarding every other pixel in both the horizontal and vertical dimensions. The width and height are then padded with a padding value symmetrically on all four sides to obtain the desired image dimensions (e.g., 960×540). In other embodiments the neural network can be trained for different image dimensions and this resampling step can be adjusted accordingly.

Neural Network for Generating Estimated HDR Statistics

The predicted HDR statistics neural network (210) takes as input a single channel (its luminance) of the SDR image (202) and predicts statistics of the corresponding HDR image as needed to generate an SDR-to-HDR mapping curve (such as the minimum, average, and maximum luminance values). In some embodiments, the predicted HDR metadata (212) may be temporally filtered to ensure temporal consistency among pictures in a video scene. These values may also be adjusted for inconsistent results to ensure they can be used for mapping, e.g. by clamping the results between 0 and 1 or by ensuring monotonicity of the resulting image statistics.

In an embodiment, the neural network 210 is defined as a set of 4-dimensional convolutions, each of which is followed by adding a constant bias value to all results. In some layers, the convolution is followed by clamping negative values to 0. The convolutions are defined by their size in pixels (M×N), how many image channels (C) they operate on, and how many such kernels are in the filter bank (K). In that sense, each convolution can be described by the size of the filter bank M×N×C×K. As an example, a filter bank of the size 3×3×1×2 is composed of 2 convolution kernels, each of which operates on one channel and has a size of 3 pixels by 3 pixels.

Some filter banks may also have a stride, meaning that some results of the convolution are discarded. A stride of 1 means every input pixel produces an output pixel. A stride of 2 means that only every second pixel in each dimension produces an output, and the like. Thus, a filter bank with a stride of 2 will produce an output with (M/2)×(N/2) pixels, where M×N is the input image size. All inputs except the ones to fully connected kernels are padded so that setting the stride of 1 would produce an output with the same number of pixels as the input. The output of each convolution bank feeds as an input into the next convolution layer.

Figure 3:
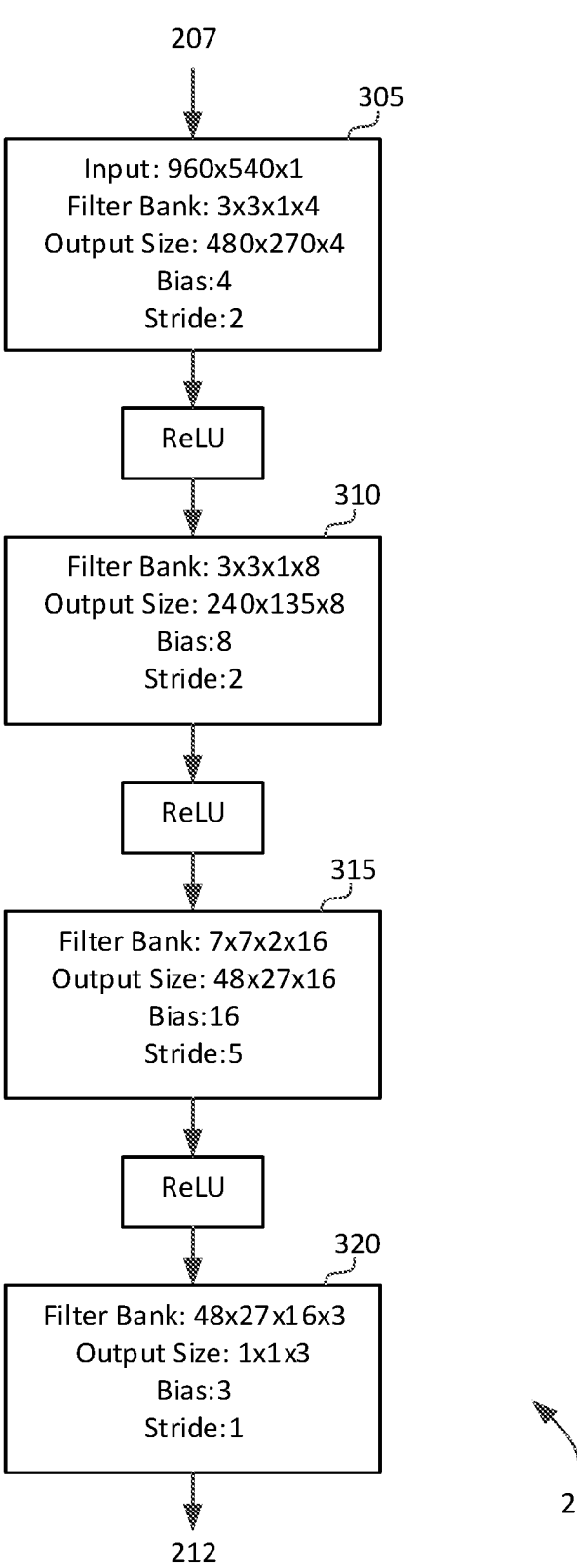
FIG. 3 depicts an example neural-network architecture to predict luminance metadata according to an example embodiment of the present invention.

As depicted in FIG. 3, in an embodiment, the neural network (210) is composed of four such convolution layers:

A first filter bank (305) sized 3×3×1×4, with a stride of 2 and 4 biases, followed by a first rectified linear unit (ReLU) activation function.

A second filter bank (310) sized 3×3×1×8, with a stride of 2 and 8 biases, followed by a second ReLU.

A third filter bank (315) sized 7×7×2×16, with a stride of 5 and 16 biases, followed by a third ReLU.

A fourth filter bank (320) sized 48×27×16×3, fully connected, with 3 biases and one 1×3 output (212) representing the estimated minimum, med., and maximum luminance levels of an HDR image corresponding to the SDR input.

In an embodiment, NN (210) is trained on pairs of HDR and SDR images. For example, a large collection of HDR images is mapped to corresponding SDR images using a tone mapping operation, such the one described in Refs. [1] and [2]. This process includes the analysis of the reference HDR metadata (e.g., min, mid, and max luminance values) from the HDR source images being used during the tone mapping process. The goal of the network is to learn the relationship between metadata from the estimated HDR image and the reference HDR image. In one embodiment, this is done by iteratively calculating predicted HDR metadata using the neural network architecture and minimizing the error between the predicted HDR metadata and the reference HDR metadata, by propagating the error back into the network weights. The training terminates when the error between reference and predicted metadata is within a small threshold or reaches a non-decreasing plateau.

Alternately, in another embodiment, after the generation of predicted HDR metadata, the predicted metadata is applied to up-convert the input SDR image into its corresponding HDR image. The source HDR image and the predicted HDR image are compared, and errors are back-propagated to the network. It has been observed that training based on errors between original and predicted images than based on errors between original and predicted metadata yields a better performing neural network.

Given the predicted HDR metadata (212), step 215 generates an optimal mapping curve to be used by the display mapping process (220). It is noted that neural net 210 does not generate a mapping for a specific display. As a result, the output of such SDR-to-HDR mapping may exceed the capabilities of the target display, thus requiring a second HDR (predicted image)-to-HDR (display) mapping that takes into consideration the characteristics of the target display. This second HDR-to-HDR mapping may be skipped if the generated HDR data are simply stored off-line or are transmitted to be displayed by another device downstream.

For example, in an embodiment, the predicted HDR metadata (212) is processed to generate a "forward-mapping" curve to map an HDR image with the predicted HDR metadata to an SDR signal range (see Ref. [3] or Ref. [4]). In an additional step, the forward mapping curve may be inverted to generate an "inverse-mapping" curve that would convert the SDR signal range of the source image to the HDR signal range of the predicted HDR image. This inverse mapping curve is then further adjusted to map the predicted HDR image dynamic range according to the characteristics of the target display (such as its minimum and maximum luminance) or other parameters, such as desired contrast or surrounding ambient light. Finally, in step 220, using the input SDR image (202) and the mapping curve (217) derived in step 215, the display mapping process generates the final HDR image (222) for the target display (e.g., see Refs. [1-2]).

Local-Tone Mapping Adaptation

Since the generated mapping curve (217) is applied to the whole image (202), the up-conversion process 200A may be considered a global dynamic-range mapping process. As described in more detail in Ref. [2], the display mapping process 220 may be further improved by taking into consideration local contrast and details information of the input image. For example, as described in the Appendix, a down-sampling and up-sampling/filtering process may be used to split the input image into two layers: a filtered base layer image and a detail layer image. By applying the tone-mapping curve (217) to the filtered base layer, and then adding back the detail layer to the result, the original contrast of the image can be preserved both globally as well as locally. This may be referred to as "detail preservation" or as "precision rendering."

Thus, display-mapping can be performed as a multi-stage operation:

a) Generate a base layer (BL) image to guide the SDR to HDR mapping;

b) Perform the tone-mapping to the base layer image;

c) Add the detail layer image to the tone-mapped base layer image.

In Ref. [2], the generated base layer (BL) represents a spatially-blurred, edge-preserved, version of the original image. That is, it maintains important edges but blurs finer details. More specifically, generating the BL image may include:

Using the intensity of the original image, creating an image pyramid with layers of lower resolutions, and saving each layer Starting with the layer of the lowest resolution, up-sampling to higher layers to generate the base layer. An example of generating a base layer and a detail layer image may be found in Ref. [2] or in the Appendix of this specification.

Figure 2B:
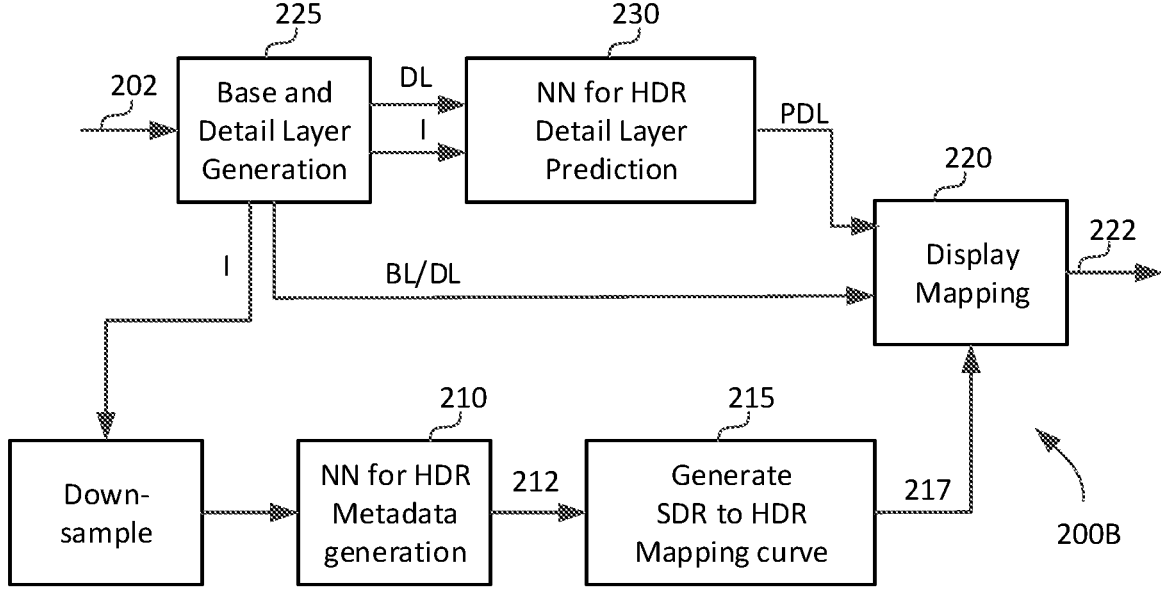
FIG. 2B depicts a dynamic range up-conversion and display management pipeline according to a second example embodiment of the present invention with two neural-network processing units.

FIG. 2B depicts an example embodiment of inverse mapping and display management process (200B) using a second neural net (230) that takes advantage of a pyramid representation of the input image and precision rendering. As depicted in FIG. 2B, process 200B includes a new block (225), which, given the intensity (I) of the original image, it generates a base layer ($I_{BL}$) (BL) image and a detail layer image ($I_{DL}$) (DL). In an embodiment, pixels (x, y) of the detail layer image are generated as $$I_{DL}(x, y) = I(x, y) - I_{BL}(x, y) * dg, \qquad (1)$$

where dg denotes a detail-gain scaler in [0, 1].

The predicted HDR detail neural network (230) takes as input two channels: the detail layer (DL) of the SDR image and the intensity (I) channel of the source SDR image. It generates a single channel predicted detail layer (PDL) image, with the same resolution as the detail layer image, containing residual values to be added to the detail layer image. In an embodiment, the detail layer residuals stretch the local contrast of the output image to increase its perceived contrast and dynamic range. By utilizing both the detail layer input and the input image the neural network can predict contrast stretching based not only on the contents of the detail layer but also based on the content of the source image. In a way, this gives the network the possibility to correct for any problems the fixed precision rendering decomposition into base and detail images may have.

Given block 225, which generates already the luminance image I, in 200B, block 205 in 200A can be simplified by performing only the appropriate down-sampling of I to the appropriate input resolution of neural-network 210 (e.g., 960×540).

Figures 4A, 4B:
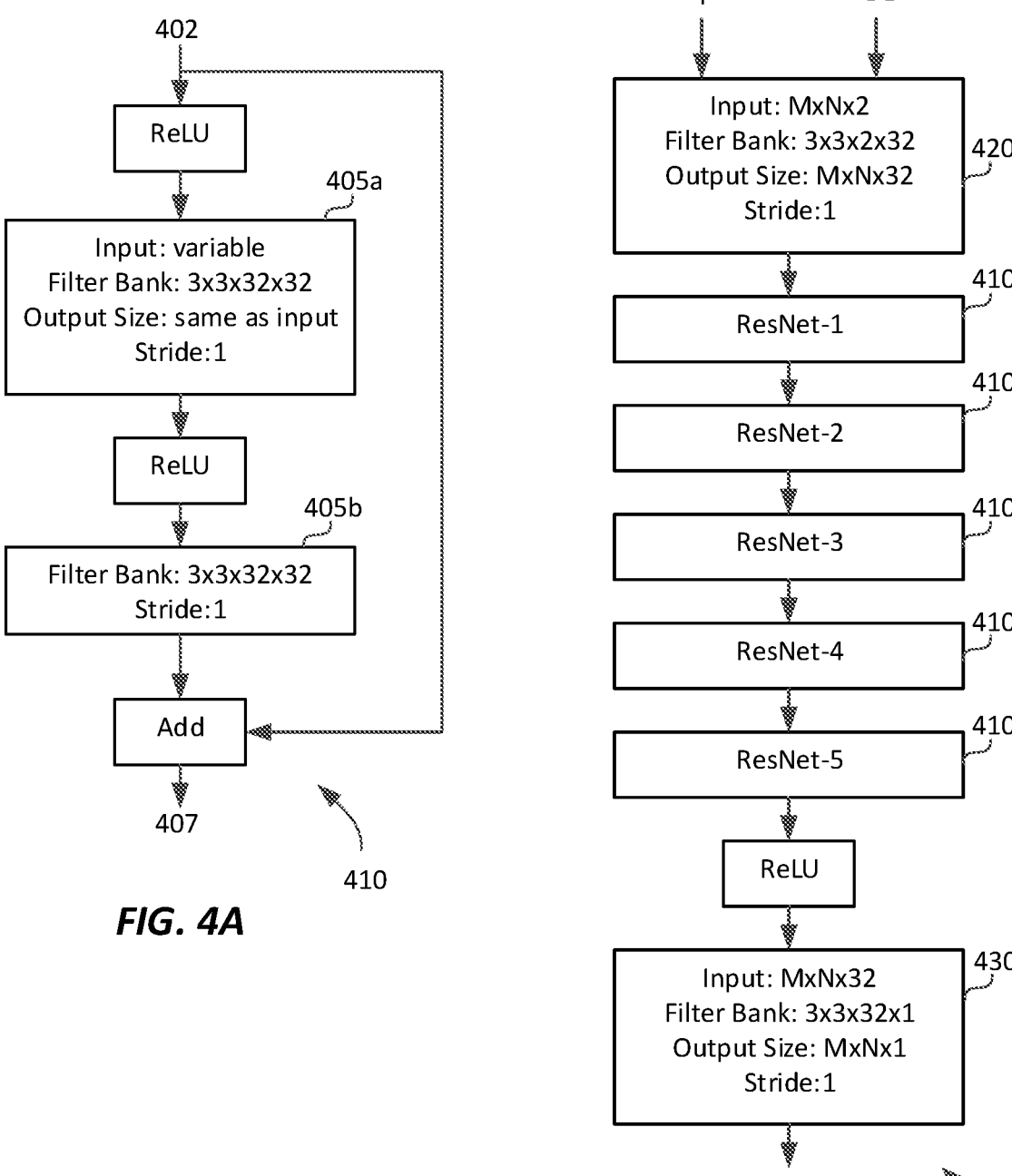
FIG. 4A depicts a processing pipeline in a Residual Network (ResNet) block being used in a neural network to predict a detail layer residual image according to an example embodiment of the present invention.
FIG. 4B depicts a processing pipeline in a neural network to predict a detail layer residual image according to an example embodiment of the present invention.

Neural network 230 is composed of convolutional layers and Residual Network (ResNet) layers. As depicted in FIG. 4A, in an embodiment, each ResNet block (410) contains two convolution layers (405a, 405b) with ReLU units, with the input (402) to each ResNet unit being added to the output of the second convolutional layer (405b) to generate the ResNet output (407). In an embodiment, each convolutional layer (405) has a 3×3×32×32 filter bank, with no biases, and a stride of 1.

As depicted in FIG. 4B, the predicted HDR detail layer neural network 230 is composed of an input convolution (420), followed by five ResNet blocks (410) (each one depicted in FIG. 4A), followed by a final ReLU and an output convolution (430). The output of the network forms an M×N image, the same size as the input detail layer image. This output is then added to the input detail layer image to form the final detail layer image. In some embodiments, instead of using the input images (I, DL) at full resolutions (M×N) one may use sub-sampled versions to reduce complexity. Then, the output residual image (PDL) may be upscaled to the full resolution.

In an embodiment, convolution network 420 has: input M×N×2, a filter bank of: 3×3×2×32, stride 1, no biases, and an output of M×N×32. Similarly, convolution network 430 has: input M×N×32, a filter bank of: 3×3×32×1, stride 1, no biases, and an output of M×N×1

The network may be trained on pairs of HDR and SDR images. In an embodiment, a large collection of HDR images are mapped to SDR using a tone mapping operation, such as described in Ref. [2]. This pair is then processed by the HDR detail layer prediction NN, where the error signal between the reference and predicted HDR images is propagated to the weights of the neural network. Training terminates when the error is below a threshold or reaches a non-decreasing plateau. During training of the NN 230, the dg scaler in equation (1) may be set to 1.

In some embodiments, one can use the base layer $I_{BL}$ directly, or in combination with the input intensity image I, as in $$I_B = \alpha * I_{BL} + (1 - \alpha) * I,$$

where a is a scaler in [0, 1]. When $\alpha=0$, the tone-mapping is equivalent to a traditional global tone-mapping (see process 200A). When $\alpha=1$, tone mapping is performed only on the base layer image.

Given $I_{DL}$, an optional scaler $\beta$ in [0, 1] on image $I_{DL}$ may be used to adjust the sharpening of the tone-mapped output to the generate final tone-mapped image $$I' = I'_{BL} + I_{DL} * \beta, \qquad (2)$$

where $I'_{BL}$ denotes a tone-mapped version of $I_{BL}$ (or $I_B$). When the predictive neural network 230 is being used, then $$I' = I'_{BL} + (I_{DL} + PDL) * \beta. \qquad (3)$$

In an alternative implementation, process 200B may be simplified by bypassing (removing) the NN for HDR detail layer prediction (230) and by using only the original detail layer (DL). Thus, given a pyramid representation of the input SDR image, process 200B may be adjusted as follows:

In block 225, split the intensity of the input image into a base layer and a detail layer As before, use the output (212) of the NN for HDR metadata generation to generate a mapping curve 217

Use the mapping curve to generate an optimized mapping of only the base layer of the input image Add the original detail layer (DL) to the optimized mapping to generate the final HDR image (e.g., see equation (2)).

REFERENCES

Each one of the references listed herein is incorporated by reference in its entirety.

1. U.S. Pat. No. 9,961,237, "Display management for high dynamic range video," by R. Atkins.

2. PCT Application PCT/US2020/028552, filed on 16 Apr. 2020, WIPO Publication WO/2020/219341, "Display management for high dynamic range images," by R. Atkins et al.

3. U.S. Pat. No. 8,593,480, "Method and apparatus for image data transformation," by A. Ballestad and A. Kostin, 4. U.S. Pat. No. 10,600,166, "Tone curve mapping for high dynamic range images," by J. A. Pytlarz and R. Atkins.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to image up-converting and display mapping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to image up-converting and display mapping as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to image dynamic range conversion and display mapping are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX

Examples processes for generating a Base Layer image and a Detail Layer image from an input image.
Pyramid Down-Sampling Given an intensity image of a source image, the Base Layer (BL) image may be constructed by a combination of down-sampling and up-sampling operations on the intensity image. In some embodiments, during down-sampling, layers of the pyramid may be skipped in order to reduce the memory bandwidth. For example, with a 4K input image, the first layer (say, at 2K resolution), could be skipped. Then, during up-sampling, the quarter resolution image would simply be doubled twice. For example, given a 4K input, in an embodiment, the pyramid may generate the following layers: 1024×576, 512×288, 256×144, 128×72, 64×36, 32×18, and 16×9. Similarly, for an 8K input image, both the half and quarter resolution layers may be skipped. This ensures that no matter the input image size, the subsequent layers of the pyramid will have the same dimensions.

While the pyramid is described in terms of sub-sampling using sub-sampling factors 2, 4, 8, and the like, other sub-sampling factors may be used without loss of generality.

As an example, in creating the pyramid, the k-th line at the n-th pyramid layer (e.g., n=2 to 7), is generated by proper filtering of lines 2*k and 2*k−1 at the previous layer. In an embodiment, such filtering is performed using either a separable low-pass 2×2 filter (e.g., with filter coefficients [1 1]/2) or a separable 4×4 low-pass filter (e.g., with filter coefficients [1 3 3 1]/8). The 4×4 filter results in better alignment between the pyramid levels but requires additional line buffers. In another embodiment, one may apply different filters in the horizontal and vertical directions, e.g., a 4-tap horizontal filter and a 2-tap vertical filter, or vice versa.

Before computing the first level of the pyramid (e.g., at 1024×576), the input image may be padded to:
  guarantee that all spatial dimensions are divisible by two, from the smallest to the largest pyramid levels
  replicate border pixels, taking into account a specified region of interest (ROI)
  replicate border pixels, taking into account input images of various sizes or aspect ratios
Pyramid Up-Sampling In up-sampling, a processor receives the down-sampled pyramid data and reconstructs the original image in its original resolution using, at each layer, an edge-aware up-sampling filter. The smallest level of the pyramid is up-sampled first, then, additional levels are up-sampled, up to the resolution of the highest pyramid level.

Denote as P(i) the pyramid image at layer i. Starting at the lowest resolution level (e.g., i=7), the lowest resolution pyramid image (e.g., P(7)) is fed to an edge-preserving filter which generates two coefficient "images" to be denoted as Ima(7) and Imb(7) (defined below). Next, both Ima and Imb are up-sampled by a factor of two to generate up-sampled coefficient images ImaU(7) and ImbU(7).

At the next layer, i=6, the P(6) layer of the pyramid is combined with the up-sampled coefficient images ImaU(7) and ImbU(7) to generate image $$S(6) = ImaU(7) * P(6) + ImbU(7), \tag{4}$$

which together with image P(6) are fed to the edge-up sample filter to generate the coefficient "images" Ima(6) and Imb(6). Next, Ima(6) and Imb(6) are up-sampled by a factor of two to generate up-sampled coefficient images ImaU(6) and ImbU(6). The same process continues for the other pyramid layers. In general, for i=7, 6, 5, . . . , 2, $$S(i-1) = ImaU(i) * P(i-1) + ImbU(i), \tag{5}$$

where the operation "*" of multiplying a coefficient image with an image corresponds to multiplying pixel by pixel their corresponding pixels. For example, at pixel location (m,n), for a pyramid level i with dimensions W(i)×H(i), $$S(i-1)_{m,n} = ImaU(i)_{m,n} * P(i-1)_{m,n} + ImbU(i)_{m,n}, \tag{6}$$

for $m = 1, 2, \ldots , W(i-1)$ and $n = 1, 2, \ldots , H(i-1)$.

After processing the second level of the pyramid (i=2), given S(1) and P(1), the edge filter will generate two parameter images Ima(1) and Imb(1). To generate a 4K image, Ima(1) and Imb(1) can be upscaled by 2. To generate an 8K image, Ima(1) and Imb(1) can be upscaled by 4. The two upscaled coefficient images (ImaU(1) and ImbU(1)), combined with the intensity image (I) of the input video may be used to generate a base layer image, as $$BL = I_{BL} = ImaU(1) * I + ImbU(1). \tag{7}$$

Generalizing, given a pyramid with N layer pictures (e.g., P(1) to P(N)), generating the coefficient images Ima(1) and Imb(1) comprises:

generate Ima(N) and Imb(N) using an edge filter and P(N), the N-layer pyramid image with the lowest spatial resolution;
    generate ImaU(N) and ImbU(N) by up-scaling Ima(N) and Imb(N) to match the spatial resolution of the N−1 layer;

```
for (i = N-1 to 2) {
    S(i) = ImaU(i + 1) * P(i) + ImbU(i + 1)
    generate Ima(i) and Imb(i) using the edge filter, S(i) and P(i)
}
compute S(1) = ImaU(2) * P(1) + ImbU(2); and
generate Ima(1) and Imb(1) using the edge filter, S(1) and P(1).
```

In an embodiment, each of the S(i), P(i), $P^2(i)$, and P(i)*S(i) inputs are convolved horizontally and vertically using a 3×3 separable low-pass filter, such as H=[1 2 1]/4. Their corresponding outputs can be denoted as Sout, Pout, P2out, and PSout. While these signals are specific to each layer, for simplicity, the index i is not used. Then, $$Pvar = P2out - Pout^2, \tag{8}$$

$$PScov = PSout - Sout * Pout,$$

$$Ima(i) = PScov/(Pvar + PW(i)),$$

$$Imb(i) = Sout - Ima(i) * Pout.$$

The invention claimed is:

1. A method for dynamic range conversion and display mapping, the method comprising:
    accessing an input image in a first dynamic range and a first spatial resolution;
    generating an intensity image based on the input image;
    applying the intensity image to a first neural network to generate predicted statistics of the intensity image when mapped in a second dynamic range higher than the first dynamic range; and
    generating a tone-mapping curve based on statistics of the intensity image and the predicted statistics; and
    applying the tone-mapping curve to the input image to extend the dynamic range of the input image, wherein the first neural network comprises four layers, wherein the first layer comprises a first filter bank sized 3×3×1×4, with a stride of 2 and 4 biases, followed by a first rectified linear unit (ReLU) activation function;
    the second layer comprises a second filter bank sized 3×3×1×8, with a stride of 2 and 8 biases, followed by a second ReLU;
    the third layer comprises a third filter bank sized 7×7×2×16, with a stride of 5 and 16 biases, followed by a third ReLU; and
    the fourth layer comprises a fourth filter bank sized 48×27×16×3, fully connected, with 3 biases and one 1×3 output representing the predicted statistics of the intensity image when mapped in the second dynamic range.

2. The method of claim 1, further comprising generating, based on the input image and the tone-mapping curve, a mapped output image for display on a display with a target dynamic range.

3. The method of claim 1, further comprising applying the tone-mapping curve to display the input image on a display with a target dynamic range different than the second dynamic range.

4. The method of claim 1, wherein the statistics of the intensity image comprise intensity values of the intensity image in the first dynamic range, and the predicted statistics comprise predicted intensity values in the second dynamic range.

5. The method of claim 1, wherein the statistics of the intensity image comprise minimum, average, and maximum intensity values of the intensity image in the first dynamic range, and the predicted statistics comprise predicted minimum, average, and maximum intensity values in the second dynamic range.

6. The method of claim 1, further comprising reducing the first spatial resolution of the intensity image before applying it to the first neural network.

7. An apparatus comprising a processor and configured to perform claim 1.

8. A non-transitory computer-readable storage medium having stored thereon computer-executable instruction for executing a method with one or more processors in accordance with claim 1.

9. A method for dynamic range conversion and display mapping, the method comprising:

accessing an input image in a first dynamic range and a first spatial resolution;

generating an intensity image based on the input image;

applying the intensity image to a first neural network to generate predicted statistics of the intensity image when mapped in a second dynamic range higher than the first dynamic range; and generating a tone-mapping curve based on statistics of the intensity image and the predicted statistics;

applying the tone-mapping curve to the input image to extend the dynamic range of the input image;

generating a base layer image and a detail layer image based on the intensity image; and applying the tone-mapping curve to the base layer image to generate a tone-mapped base layer image in the second dynamic range.

10. The method of claim 9, wherein the base layer image represents a spatially-blurred, edge-preserved, version of the intensity image and generating the detail layer image comprises computing:

$$I_{DL}(x, y) = I(x, y) - I_{BL}(x, y) * dg,$$

where, at pixel locations (x,y), $I_{DL}$ denotes the detail layer image, $I_{BL}$ denotes the base layer image, I denotes the intensity image, and dg denotes a detail-gain scaler in [0, 1].

11. The method of claim 9, further comprising:

adding the detail layer image to the tone-mapped base layer image to generate an output image in the second dynamic range.

12. The method of claim 11, further comprising: applying a display mapping process to map the output image to a display in a target dynamic range different than the second dynamic range.

13. The method of claim 9, further comprising:

applying the intensity image and the detail layer image into a second neural network to generate a residual layer image in the second dynamic range;

adding the residual layer image to the detail layer image to generate a second detail layer image; and adding the second detail layer image to the tone-mapped base layer image to generate an output image in the second dynamic range.

14. The method of claim 13, wherein the second neural network comprises an input convolution network, followed by five Residual Networks (ResNet) blocks, followed by a final ReLU and an output convolution network.

15. The method of claim 14, wherein the input convolution network comprises:

an M×N×2 input;

a filter bank of: 3×3×2×32, stride 1, no biases; and an M×N×32 output; and the output convolution network comprises:

an M×N×32 input;

a filter bank of: 3×3×32×1, stride 1, no biases; and an M×N×1 output, wherein M and N are integers.

16. The method of claim 14, wherein a Residual Network block comprises:

a first ReLU, followed by a first convolution layer, followed by a second ReLU, followed by a second convolution layer, followed by an adder to add the input to the ResNet network block with the output of the second convolution layer to generate a ResNet output, wherein each of the first and second convolutional layers has a 3×3×32×32 filter bank, with no biases, and a stride of 1.

* * * * *